United States Patent
Harfmann et al.

(10) Patent No.: US 6,258,863 B1
(45) Date of Patent: Jul. 10, 2001

(54) PROCESS FOR PRODUCING ALKENYL AROMATIC FOAMS HAVING INCREASED THERMAL INSULATION USING CYCLOALKANE BLOWING AGENT AND FOAMS PRODUCED THEREBY

(75) Inventors: Walter R. Harfmann, Matthews, NC (US); Michael E. Reedy, Keyport, NJ (US)

(73) Assignee: Reedy International Corporation, Keyport, NJ (US)

( * ) Notice: Subject to any disclaimer, the term of this patent is extended or adjusted under 35 U.S.C. 154(b) by 0 days.

(21) Appl. No.: 09/206,688

(22) Filed: Dec. 7, 1998

(51) Int. Cl.⁷ .................. C08J 9/12; C08J 9/14
(52) U.S. Cl. .............. 521/81; 521/79; 521/139; 521/146
(58) Field of Search .............. 521/79, 81, 146, 521/139

(56) References Cited

U.S. PATENT DOCUMENTS

| | | |
|---|---|---|
| 4,344,710 | 8/1982 | Johnson et al. . |
| 4,419,309 | 12/1983 | Krutchen . |
| 4,424,287 | 1/1984 | Johnson et al. . |
| 4,772,441 | 9/1988 | Voss et al. . |
| 4,916,166 | 4/1990 | Suh et al. . |
| 4,997,706 | 3/1991 | Smits et al. . |
| 5,011,866 | 4/1991 | Suh . |
| 5,110,837 | 5/1992 | Harclerode et al. . |
| 5,218,006 | 6/1993 | Reedy et al. . |
| 5,269,987 | 12/1993 | Reedy et al. . |
| 5,830,924 | * 11/1998 | Suh et al. ................ 54/79 |

FOREIGN PATENT DOCUMENTS

| | | |
|---|---|---|
| 52724/79 | 5/1980 | (AU) . |
| 0 411 923 B1 | 2/1991 | (GB) . |
| 2022501 | 2/1991 | (CA) . |

* cited by examiner

*Primary Examiner*—Morton Foelak
(74) *Attorney, Agent, or Firm*—Philip E. Roux, Esq.; Clifford Chance Rogers & Wells, LLP

(57) ABSTRACT

Process for producing alkenyl aromtic foams utilizing a cycloaliphatic gas as blowing agent, are described. Also disclosed are alkenyl aromatic foams produced by the process which exhibit increased thermal insulation properties.

31 Claims, No Drawings

PROCESS FOR PRODUCING ALKENYL AROMATIC FOAMS HAVING INCREASED THERMAL INSULATION USING CYCLOALKANE BLOWING AGENT AND FOAMS PRODUCED THEREBY

FIELD OF THE INVENTION

This invention relates to a process for producing alkenyl aromatic foams utilizing cycloalkane as a blowing agent. The process preferably also uses a predetermined amount of a masterbatch mix comprised of styrene resin and rubbery block copolymer. The invention also relates to foamable compositions used in the process and to alkenyl aromatic foams resulting from the process, and articles made therefrom. Preferably, the alkenyl aromatic is polystyrene and the cycloalkane is cyclopentane or cyclohexane. The process results in the foams of the present invention being conferred with several benefits among which are an increase in the thermal insulation properties of the foams, thereby providing greater insulation properties at the same thickness as conventional foam insulation, or equal thermal insulation at a thinner thickness than conventional foam insulation.

BACKGROUND OF THE INVENTION

A variety of normally gaseous or liquid blowing agents have been proposed for olefinic or styrenic polymers, including virtually all of the common atmospheric gases and lower hydrocarbons.

Alkenyl aromatic foams, particularly polystyrene foams in sheet form, are presently being made from a number of blowing agents which may have many undesirable characteristics. Volatility, flammability, poor thermoforming qualities, brittle physical properties, high cost, or an adverse affect to the ozone layer are just a few. Examples of the blowing agents that produce these characteristics in the production of polystyrene foam include the aliphatic hydrocarbons, and fully (or partially) halogenated hydrocarbons.

For polystyrene, for example, the $C_4$–$C_6$ alkanes have gathered widespread acceptance, especially pentane. Following a typical extrusion foaming step, the stock foam material is ordinarily aged before thermoforming into articles or the like. During aging, the foam cells and polymeric matrix become partially depleted of volatile hydrocarbons, which enter the atmosphere. Potential atmospheric contamination by these by-products of foam manufacture has led manufacturers to seek non-polluting alternative blowing agents, such as the usual atmospheric gases, e.g., nitrogen and carbon dioxide, and combinations of atmospheric gases with organic gases, e.g., the lower hydrocarbons or the freons.

In the prior art, both atmospheric gases, per se, and combinations of atmospheric and organic gases have been disclosed as blowing agents for alkenyl aromatic polymers.

Australian Patent Application No. 52724/79, published Canadian Patent Application No. 2,022,501 and published European Patent Application No. 0,411,923 all disclose blowing agents consisting of carbon dioxide for alkenyl aromatic or styrenic polymers. The resulting foamed products are said to be flexible and/or have improved tensile elongation properties. However, the production rates of the processes are generally low, with a rate potentially less than 200 lbs./hr., and the foam products also have generally low postexpansion properties, on the order of 50% or less. Low post-expansion generally results, in part, in weight increases in the foam, adding to manufacturing costs. In addition, these processes require relatively high extrusion die temperatures, on the order of 130° C. to 155° C. Thus, these processes are not very economical.

U.S. Pat. Nos. 4,344,710 and 4,424,287 disclose blowing agents which are combinations of liquid carbon dioxide and liquid aliphatic, or fully (or partially) halogenated hydrocarbons. These patents state that the use of atmospheric gases, including 100% carbon dioxide or nitrogen as blowing agents has not been successfully employed, giving as a reason the extreme volatility of these gases, and further state that the use of these materials is said to produce corrugation and surface defects in the sheet product. These two patents disclose that a combination of atmospheric and organic gases, in an alkane: $CO_2$ feed ratio in the range of 3:1 to 1:1 by weight, can be used, with the total amount of blowing agent combination being in the range of 2.5 to 10 parts per 100 parts by weight of thermoplastic resin. As nucleating agents for the foamed products, the patents disclose the use of a mixture of sodium bicarbonate and citric acid. The process temperatures needed for extrusion of the foam are again quite high, on the order of 150° C.

U.S. Pat. No. 4,424,287 further discloses that the foams prepared with the combination of blowing agents exhibit the advantage of reduced atmospheric emissions upon aging without, however, any data to this effect, merely stating that the reduction in pollutant (i.e. the hydrocarbon blowing agents) is greater than the expected reduction due to the corresponding decrease in organic blowing agent use. The only rationale provided in U.S. Pat. No. 4,424,287 for the reduced hydrocarbon emissions is the ability of the foamed sheet product to be immediately thermoformed, thereby reducing the need for aging of the foamed sheet product.

U.S. Pat. No. 4,419,309 discloses the use of two foaming agents; the first being introduced into a molten thermoplastic resin under higher pressure, with the first foaming agent being selected from a low molecular weight aliphatic hydrocarbon (mentioning cyclopentadiene), a low molecular weight halocarbon and mixtures thereof, and the second foaming agent being introduced under lower pressure, with the second foaming agent being selected from carbon dioxide, water vapor and mixtures thereof, to cause foaming of the melted thermoplastic resin. Again, the extrusion rates are low, on the order of 150 lbs./hr., and the extrusion temperatures are high, on the order of 290° F.–320° F.

U.S. Pat. Nos. 4,916,166 and 5,011,866 disclose alkenyl aromatic thermoplastic synthetic resinous elongated foam bodies having a machine direction, a transverse direction and closed, non-interconnecting gas-containing cells, which are prepared using, preferably, at least 70% by weight of 1,1-difluoro-1-chloroethane (U.S. Pat. No. 4,916,166) and requiring the use of at least 70% by weight of 1,1,1,2 tetrafluoroethane or 1,1,1-trifluoroethane, based on the total weight of blowing agent mixture weight (U.S. Pat. No. 5,011,866), and using as a second blowing agent up to 30 weight percent (of the blowing agent in an amount of mixture) chemical or physical blowing agents, including water, 1–4 carbon aliphatic hydrocarbons, carbon dioxide, or other hydrogen-containing chlorofluorocarbons (HCFCs) such as chlorodifluoromethane (HCFC-22).

U.S. Pat. No. 4,916,166 discloses that the amount of carbon dioxide is limited to no more than about 6% by weight and that extruded articles having densities between 2.4 and 5.0 pounds per cubic foot may be obtained only by extrusion at a die temperature of about 118° C. or less. The specific examples of U.S. Pat. No. 4,916,166 show that extruded foam articles having densities of less than 2.4 pounds per cubic foot are obtained only upon extrusion above 118° C., and these are obtained utilizing blowing agents which contain only about 2.7% by weight carbon dioxide based upon 100% by weight (total mass) of the total composition.

U.S. Pat. No. 5,011,866 discloses alkenyl aromatic thermoplastic synthetic resinous elongated foamed products having densities of from about 1 to about 6 pounds per cubic foot which have a plurality of closed non-interconnecting gas-containing cells, with the limitation that the cells contain at least 70% by weight of either 1,1,1-trifluoroethane or 1,1,1,2-tetrafluoroethane. U.S. Pat. No. 5,011,866 likewise prefers the use of less than 6% carbon dioxide as a component in a blowing agent mixture although some examples show the use of about 9% carbon dioxide.

U.S. Pat. No. 5,218,006 discloses processes for producing polystyrene foams utilizing 100% of atmospheric gas, e.g. carbon dioxide and/or nitrogen, which can be effected at a much lower extrusion temperature, i.e. on the order of about 120° C., utilizing in the melted polymer an additive comprised of a masterbatch mix containing alpha-methyl polystyrene, a rubbery block copolymer, a solid blowing agent comprised of an encapsulated combination of monosodium citrate and sodium bicarbonate, white mineral oil, and silica.

U.S. Pat. No. 5,269,987 discloses processes for producing alkenyl aromatic foams utilizing a combination of atmospheric and organic gases as blowing agent, preferably using greater than 30% by weight of atmospheric gas, and preferably also using a predetermined amount of a masterbatch mix comprising a styrenic polymer, a rubbery block copolymer, and a solid blowing agent. Also disclosed are alkenyl aromatic foams produced by the process which exhibit increased densities, increased thermoforming capabilities, increased post-expansion properties, and increased retainment of the atmospheric and organic gases.

In the prior art, the use of cycloalkanes as possible blowing agents has been described.

For example, in U.S. Pat. No. 4,772,441, the use of the cycloalkane blowing agents in processes for impregnating styrene polymer beads with blowing agents, for use in molding processes, in conjunction with a minor amount of aliphatic hydrocarbons containing seven to nine carbon atoms are disclosed.

In U.S. Pat. No. 4,997,706, the preparation of polyurethane and polyisocyanurete foams are described, in which the use of a $C_{2-6}$ polyfluorocarbon compound, including cyclic polyfluoro carbon compounds (i.e. perfluoro cyclopropane, perfluoro cyclobutane, and the like) are used as blowing agents.

In U.S. Pat. No. 5,110,837, there are disclosed molded polymeric products made by the use of a multi-step expansion of polymer beads in which a great number of potential blowing agents are recited, including some cycloalkane blowing agents. The polymer bead utilized according to this patent is recited as a specific polymer type having required characteristics of polydispersity, molecular weight, molecular weight ratios and branching. The patent also recites that the blowing agent (preferably pentane) is added to the polymer during the polymerization process. The patent also calls for the use of a low level of blowing agent, between 2–4.4 weight percent.

There still exists a need in the art for alkenyl aromatic foams which exhibit increased thermal insulation properties to make the use of foams suitable, from a cost effectiveness and engineering requirements point of view, for insulation purposes, and, therefore, practical in applications where standard insulation products, e.g., fiberglass and/or polyurethane foams, are currently used.

This and other needs still remaining in the alkenyl aromatic foam art are met and satisfied by applicants' present invention, described below.

SUMMARY OF THE INVENTION

Thermoplastic foams made from styrenic polymers, such as polystyrene, have found extensive use, particularly as insulating materials. Generally, insulating styrenic foams are produced in thickness greater than about one-half inch. The insulating value of such foams is measured in terms of heat conduction resistance or R-value, per one inch of foam thickness, and adequate insulating foams typically have R-values of about 5.0 per inch or greater. Styrenic insulating foams to meet government construction standards generally must also be dimensionally stable, i.e., they must have a maximum change in any of length, width or thickness of less than about 2.0 percent when subjected to a 158° F. temperature for 24 hours.

It is an object of this invention therefore to provide a plate-like polystyrene resin foam having excellent heat insulating property, particularly a polystyrene resin foam having a heat conduction resistance R, determined for a 25 mm-thick specimen kept at an average temperature of 23.9° C. (75° F.), of a least 5. The heat conduction resistance R, as used herein, is defined as the quotient of the thickness (inches) of the specimen divided by its thermal conductivity (Btu.inches/ft$^2$.hr. ° C.). The larger the R value, the better the heat insulating property of the specimen.

In accordance with the present invention, there is provided a process for the production of alkenyl aromatic foams, said process comprising:
(a) heating an alkenyl aromatic resin to a temperature above its melting point to form a melted alkenyl aromatic resin;
(b) adding talc to the melted alkenyl aromatic resin to form an alkenyl aromatic/talc blend;
(c) injecting into the alkenyl aromatic/talc blend a non-solid blowing agent comprised of cycloaliphatic gas to form an injected melted blend;
(d) mixing the injected melted blend to form a mixed injected melted blend; and
(e) cooling and extruding the mixed injected melted blend as an alkenyl aromatic foam.

In another embodiment of the present invention, there is provided an alkenyl aromatic foam composition comprised of:
(a) an alkenyl aromatic polymer; and
(b) talc, wherein the foam is comprised of closed cells containing cycloaliphatic gas.

In a further embodiment, the present invention provides a process for the production of alkenyl aromatic foams, said process comprising:
(a) heating an alkenyl aromatic resin to a temperature above its melting point to form a melted alkenyl aromatic resin;
(b) adding to the melted alkenyl aromatic resin (1) a masterbatch mix comprised of:
  (i) a styrene resin;
  (ii) a rubbery block copolymer; and
  (iii) a solid blowing agent, to form an alkenyl aromatic/masterbatch mix blend;
(c) heating the alkenyl aromatic/masterbatch mix blend to a temperature sufficient to form a melted blend;

(d) injecting into the melted blend a non-solid blowing agent comprised of cycloaliphatic gas to form an injected melted blend;

(e) mixing the injected melted blend to form a mixed injected melted blend;

(f) cooling the mixed injected melted blend; and (g) extruding the cooled blend as an alkenyl aromatic foam.

In a still further embodiment of the present invention, there is provided alkenyl aromatic foam compositions comprised of:

(a) an alkenyl aromatic polymer;

(b) a styrene resin;

(c) a rubbery block copolymer; and (d) the decomposition products of a solid blowing agent, wherein the foam is comprised of closed cells containing therein a combination of atmospheric gas and cycloaliphatic gas.

In yet another further embodiment of the present invention, there is provided a process for the production of alkenyl aromatic foams, said process comprising:

(a) heating an alkenyl aromatic resin to a temperature above its melting point to form a melted alkenyl aromatic resin;

(b) adding to the melted alkenyl aromatic resin (1) a masterbatch mix comprised of:
  (i) styrene resin;
  (ii) rubbery block copolymer; and
  (iii) solid blowing agent and (2) talc to form an alkenyl aromatic/masterbatch mix/talc blend;

(c) heating the alkenyl aromatic/masterbatch mix/talc blend to a temperature sufficient to form a melted blend;

(d) injecting into the melted blend a non-solid blowing agent comprised of cycloaliphatic gas to form an injected melted blend;

(e) mixing the injected melted blend to form a mixed injected melted blend;

(f) cooling the mixed injected melted blend; and (g) extruding the cooled blend as an alkenyl aromatic foam.

In yet still another embodiment of the present invention, there is provided an alkenyl aromatic foam composition comprised of:

(a) an alkenyl aromatic polymer;

(b) styrene resin;

(c) rubbery block copolymer;

(d) the decomposition products of a solid blowing agent; and (e) talc, wherein the foam is comprised of closed cells containing cycloaliphatic gas.

The term cycloaliphatic gas includes blends of cycloaliphatic gases with atmospheric gas. As such, these blends may replace one or more of the cycloaliphatic gases referred to above. The term cycloaliphatic gas also includes combinations of cycloaliphatic gases, alone or with one or more blends of cycloaliphatic gas and atmospheric gas.

DETAILED DESCRIPTION OF THE INVENTION

The term cycloaliphatic gas includes blends of cycloaliphatic gases with atmospheric gas. As such, these blends may replace on or more of the cycloaliphatic gases referred to above. The term cycloaliphatic gas also includes combinations of cycloaliphatic gases, alone or with one or more blends of cycloaliphatic gas and atmospheric gas. The alkenyl aromatic polymers can be, for example, styrene polymers. The styrene polymers included in the compositions of the invention are homopolymers of styrene and copolymers and interpolymers of styrene containing a predominant proportion of styrene, e.g. greater than 50 weight percent, and preferably greater than 75 weight percent, styrene. Examples of monomers that may be interpolymerized with the styrene include alpha, beta-unsaturated monocarboxylic acids and derivatives thereof, e.g. acrylic acid, methyl acrylate, ethyl acrylate, butyl acrylate, 2-ethylhexyl acrylate and the corresponding esters of methacrylic acid, acrylamide, methacrylamide, acrylonitrile, methacrylenitrile, maleic anhydride, etc. If desired, blends of the styrene polymer with other polymers may be employed, e.g. blends of the styrene polymer with grafted rubbery diene polymers, or the analogous compositions obtained by dispersing a rubber diene polymer in the styrene monomer and, optionally, other monomers, and subsequently polymerizing the mixture. In any of the above type resins, all or a portion of the styrene may be replaced with its closely related homologues such as alpha-methylstyrene, o-, m-, and p-methylstyrenes, o-, m-, and p-ethylstyrenes, 2,4-dimethylstyrene, bromostyrene, chlorostyrene, and the like. Copolymers of alkenyl aromatic, e.g. styrene, and alkenyl nitrile, e.g., acrylonitrile can also be used and can have a weight ratio of styrene to acrylonitrile of 95:5 to 5:95 respectively.

The rubber-containing blends can have the diene rubber moiety present in amounts of about 1 to 35% of grafted diene rubber particles dispersed in a matrix polymer or copolymer as a polyblend. Generally, the rubber particles are grafted with the polymers having the same composition as the matrix phase. The diene rubbers can be polybutadiene or copolymer rubbers having at least 50% by weight of a diene monomer, e.g., butadiene, chloroprene, isoprene or pentadiene. Comonomers copolymerizable with the diene monomers can be those disclosed above. The copolymer rubbers may be interpolymers or block copolymers.

The masterbatch mix improves the flow and melt strength characteristics of the foam. The masterbatch mix comprises in its broadest aspects:

(a) a styrene resin;

(b) a rubbery block copolymer; and (c) a solid blowing agent.

An essential element of the masterbatch mix is the styrene resin. All commercially available styrene polymers can be used as the styrene resin. However, it is preferable that the Vicat softening temperature of the chosen styrene polymer be between 45 and 82 at 50° C./hr. rise. Preferred as the styrene resin is alpha-methylstyrene. Commercially known alpha-methylstyrenes include formerly Amoco's Resin 18-240, Resin 18-210 and Resin 18-290, respectively, the preferred being the Resin 18-240 which has a Vicat softening temperature of 60.5 at 50° C./hr. rise and 62.9 at 120° C./hr. rise.

Another essential element of the masterbatch mix is the rubbery block copolymer. These are known in the art generally as having the formulae: A-B, A-B-A, A-B-A-B, and the like, including graft and radial block copolymers, as well as block copolymers containing other types of blocks, "C". These rubbery block copolymers of the above formulae generally contain a styrenic polymer as the "A" block, and generally contain a rubbery polymer, e.g. butadiene, ethylene/propylene, ethylene/butylene, isoprene, as the "B" block. Block "C", when present, may be either a second, different styrenic polymer from the "A" block or a second, different rubbery polymer from the "B" block, as the case may be. Preferred as the rubbery block copolymer in the masterbatch mix are those block copolymers available from Shell Chemical Company under the designations "Kraton G" and "Kraton D", such as Kraton D-1101, Kraton D-1102, Kraton D-1107, Kraton G-1650, Kraton G-1651, Kraton G-1652, Kraton G-1657X, Kraton G-1701X, and Kraton G-1726X. Especially preferred are Kraton G-1650 and Kraton G-1652.

The final essential element of the masterbatch mix is a solid blowing agent. The solid blowing agents which can be used in the masterbatch mix are also known in the art and include mixtures of one or more solid organic acids, for example, oxalic acid, succinic acid, adipic acid, phthalic acid, and preferably citric acid; and an alkali metal carbonate or alkali metal bicarbonate, for example, magnesium carbonate, magnesium bicarbonate, ammonium bicarbonate, sodium carbonate, potassium carbonate, and preferably sodium bicarbonate. The acid and carbonate and/or bicarbonate are generally used in alkali: acid equivalent ratios of from about 1:3 to about 3:1, acid to carbonate (and/or bicarbonate), and are preferably used in approximate stoichiometric amounts, i.e. about 0.7 to 1.3 alkali equivalents per acid equivalent, preferably about 0.9 to 1.1 alkali equivalents per acid equivalent. Especially preferred as the solid blowing agent of the masterbatch mix are combinations of monosodium citrate and sodium bicarbonate, preferably encapsulated in vegetable oil (i.e. a mixture of mono-, di-, and triglycerides), the amounts of monosodium citrate and sodium bicarbonate present preferably also as a stoichiometric mixture. The most preferred solid blowing agents are the SAFOAM P and SAFOAM FP powders, available from Reedy International Corporation, Keyport, N.J. These solid blowing agents also act as nucleating agents, when present, in the process and foams of the present invention. Nucleating agents assist in the formation, situs and size of the cells in the foam.

Another nucleating agent which is used preferably in the present invention alone or in combination with another nucleating agent, is talc. The talc can be used alone or in combination with the above-described solid blowing agents. When used as the only nucleating agent, the amount of talc used in the present invention can range from 0.01%–4% by weight, based on the weight of alkenyl aromatic foam. Preferably, the amount of talc used will be 0.1%–2% more preferably 0.5%–1.5%, and most preferably 0.8%–1.2%. When used in conjunction with another nucleating agent, such as the SAFOAM products described herein, the amount of talc used will generally range from about 0.1% to about 0.5%, by weight.

The masterbatch mix may also preferably contain a lubricant/plasticizer. Suitable lubricant/plasticizers are known to those in the art and include paraffin oil, silicone oil, medium to long chain alkyl esters of phthalic acid or isophthalic acid, propylene oxide and/or mineral oil. Preferred as the lubricant/plasticizer in the masterbatch mix is white mineral oil.

The masterbatch mix may also preferably contain a quantity of silica, which can either be incorporated into pellets of the masterbatch mix, or dusted over the surface thereof.

The masterbatch mix preferably comprises essentially about 1 to 20 weight percent of stoichiometric amounts of monosodium citrate and sodium bicarbonate encapsulated in vegetable oil (preferably a mixture of mono-, di-, and triglycerides), about 3 to 50 weight percent of styreneethylene/butylene-styrene block copolymer, about 20 to 80 weight percent of alpha methyl styrene, about 1 to 20 weight percent of white mineral oil and about 0.2 weight percent of silica (which acts as a nucleating agent and aides in maintaining the free flow capability of the masterbatch mix under long term storage conditions). Among the preferred masterbatch mixes of the present invention are those available from Reedy International Corporation which are sold under the trademarks SAFOAM P-20, SAFOAM FP-20, SAFOAM FP40, SAFOAM P-50 and SAFOAM FP-50.

SAFOAM P-20 and SAFOAM FP-20 contain about 19.8% of an equimolar combination of monosodium citrate and sodium bicarbonate encapsulated in vegetable oil (SAFOAM P and SAFOAM FP, respectively, a combination of 14% mono-, 12% di-, and 72% triglycerides), 67.5% of alpha-methylstyrene (Amoco resin 18-240), about 10% of a combination of styrene-ethylene/propylene block copolymer (Shell Chemical Company, Kraton G-1726X) and styrene-ethylenelbutylene-styrene block copolymer (Shell Chemical Company, Kraton G-1650), about 2.5% of white mineral oil, and about 0.2% of silica (predominantly present as a dusted coating on the outside of pellets made from the remaining ingredients). SAFOAM FP-40 contains about 38.8% of an equimolar combination of monosodium citrate and sodium bicarbonate encapsulated in vegetable oil (SAFOAM FP, available from Reedy International Corporation), 36.6% of alpha-methylstyrene (Amoco resin 18-240), 14.4% of styrene-ethylene/butylene-styrene block copolymer (Shell Chemical Company, Kraton G-1652), about 9.0% of white mineral oil and about 0.2% silica. SAFOAM P-50 comprises about 54.8% of an equimolar combination of monosodium citrate and sodium bicarbonate encapsulated in vegetable oil (SAFOAM P, available from Reedy International Corporation), about 30.5% of alphamethylstyrene (Amoco Resin 18-240), about 12% of styreneethylene/butylene-styrene block copolymer (Shell Chemical Company, Kraton G-1650), about 7.5% of white mineral oil, and about 2% of silica.

The masterbatch mix, when used, is present in an amount of about 0.01 to about 2.0% by weight, based upon the weight of the polyalkenyl aromatic resin, preferably is present in an amount of about 0.1 to about 1.5 weight percent, based upon the weight of the resin, and more preferably is present in an amount of about 0.25 to about 1.1% by weight, based upon the weight of the resin.

The non-solid blowing agent combination of the present invention is comprised of cycloaliphatic gas and, preferably, a combination of atmospheric gas and cycloaliphatic gas, with or without an alkane or a second organic gas, such as pentane, hexane, and the like. The gases, i.e., the cycloaliphatic gas (and/or atmospheric and/or other organic gas) may be added or injected into the melt either as a blend, or concurrently, or sequentially. The non-solid blowing agent can also be added to the melt in either gaseous or liquid forms, or combinations thereof. The amount of non-solid blowing agent which can be added in the process of the present invention ranges from about 2 to about 20% by weight, based upon the weight of the resin. Preferably, non-solid blowing agent is added in an amount of about 3 to 10% by weight, based upon the weight of the resin and, more preferably, from about 5 to about 7% by weight, based upon the weight of the resin.

As cycloaliphatic gases, there can be used any of the cycloaliphatic gases known to those skilled in the art. Particularly, the cycloaliphatic gas can be selected from the group consisting of cyclobutane, cyclopentane, cyclohexane, and cycloheptane. Included within the term cycloaliphatic gas are substituted cycloaliphatic gases, such as those substituted with lower alkenyl groups, i.e., alekenyl groups containing 1–6 carbon atoms, substituted with halogens, i.e., fluorine, chlorine, bromine and the like, or containing other substitutes such as halogen containing alkenyl groups. As atmospheric gases, there can be used any of the gases normally present in the atmosphere, such as carbon dioxide, nitrogen, argon, helium, or neon, with carbon dioxide and nitrogen being preferred.

As the organic gases, there can be used: the $C_3$–$C_8$ alkanes, known to those skilled in the art, including propane, butane, isobutane, pentane, neopentane, isopentane, and hexane; and the hydrogen-containing chlorofluoro carbons (HCFCs), such as chloro difluoromethane (HCFC-22), 1,1-difluoro-1,1-chloroethane (HCFC- 142b); and the hydrogen-containing fluorocarbons (HFCs), such as 1,2-difluoroethane (HFC-152a), 1,1,1,2-tetrafluoroethane (HFC-134a), 1,1,1,-trifluoroethane (HFC-143a) and (HFC-123). The organic gas selected in addition to the cyclo-alkane must have a permeation half life in foam of less than 6 months and will be referred to as the permeable organic gas. In the embodiment of this invention, the amount of cyclo-alkane incorporated into the mixture should be 3 to 10 parts per hundred (pph) based on the weight of polystyrene extruded, more preferably 4 to 8 pph, and most preferably 5 to 7 pph. The atmospheric gas and permeable organic gas should constitute 2 to 8 pph of the mixture based on the weight of polystyrene extruded, more preferably 2 to 6 pph, and most preferably 3 to 4.5 pph. The ratio of atmospheric gas to permeable organic gas should be 1 to 100% by weight atmospheric gas to permeable organic gas, more preferably 50 to 100% by weight atmospheric gas to permeable organic gas, and most preferably 50 to 80% by weight atmospheric gas to permeable organic gas.

The purpose of incorporating a permeable gas component into the mixture is to attain low product densities but also to reduce aged internal cell gas pressure. Since the cyclo-alkane is retained in the cells for long periods of time and air permeates into the product at a relatively rapid rate, the permeable component is needed to reduce internal cell gas pressure and thereby satisfy dimensional stability criteria.

The use of an extrusion process for the manufacture of alkenyl aromatic foam is typical, but is not required. Such a process includes a primary extruder, a blowing agent addition system, a secondary extruder, board die and finishing equipment. However, the use of this exact equipment set up is not required in the process of this invention.

In the preferred embodiments of the present invention, polystyrene foam is formed in a continuous process by delivering a well-mixed and uniform blend of styrenic polymer and masterbatch mix to the extruder throat. Masterbatch mix is preferably about 0.25% to 1.0% by weight of the styrenic polymer. Once in the screw, while being rotated at a controlled RPM, the blend or feed of styrenic polymer and masterbatch mix is heated to a temperature above the melting point of the blend, about 250° to 500° F. It is then delivered with the use of relatively stable pressure in the range of about 1500–6000 psi, to the point of injection. Here, an injection system delivers cycloaliphatic gas, e.g. cyclopentane in gas or liquid form, optionally an atmospheric or other organic gas in gaseous form, and/or combinations thereof, into the melted feed. In combination with the cycloaliphatic gas, and in a preferred embodiment sequentially with respect to the delivery of the cycloaliphatic gas, the injection system delivers an atmospheric and/or organic gas, e.g. isobutane or HFC 152(a), into the melted feed.

Next, the injected melted feed is passed into a second extruder. This extruder is designed for maximum cooling capability. It is of larger capacity than the first extruder. In this extruder, a minimum of shear is desired. Minimum shear is achieved by keeping the screw's rotational speed low. The injected melted feed is mixed in this second extruder and cooled.

The feed then exits this second extruder through a die at a temperature at or above 240° F., preferably between about 240–290° F., and more preferably at a temperature of between about 240° F.–280° F. and a pressure of about 500–3,750 psi. The extruded material can be processed as foam board, or in the case of flexible insulation, is stretched out over a cooling drum and drawn to the desired thickness.

A beneficial aspect of the use of the cycloaliphatic gas is that the foam products of the present invention exhibit improved thermal insulation properties, making the use of such foams, practical in the area of home construction, and the like.

DESCRIPTION OF THE PREFERRED EMBODIMENTS

The following examples are intended to merely illustrate the present invention, which is not limited thereby or thereto.

| Sample | | 1 | 2 | 3 |
|---|---|---|---|---|
| Process Temperatures | | | | |
| Cross Over Melt | F | 456 | 450 | 460 |
| Die Melt | F | 298 | 276 | 308 |
| Process Pressures | | | | |
| Gas Injection | psig | 1950 | 1950 | 3000 |
| Primary Extruder Exit | psig | 1870 | 850 | 2690 |
| Gear Pump Inlet | psig | 1795 | 1804 | n/a |
| Gear Pump Exit | psig | 2280 | 2500 | n/a |
| Die | psig | 750 | 710 | 10 |
| Drive Conditions | | | | |
| Primary Speed | rpm | 53 | 53 | 12 |
| Primary Current | amps | 9 | 9 | 70 |
| Gear Pump Speed | rpm | 20.3 | 20.0 | n/a |
| Gear Pump Current | amps | | | n/a |
| Secondary Speed | rpm | 15.7 | 15.6 | 18.1 |
| Secondary Current | amps | 10 | 10 | 12 |
| Formulation | | | | |
| Polystyrene Type | | DOW 685D | DOW 685D | DOW 685D |
| Polystyrene Rate | lb/hr | 46.0 | 40.0 | 48.6 |
| 50% Talc Concentrate | lb/hr | 0 | 0 | 0.53 |
| | (%) | 0.00% | 0.00% | 0.98% |
| Safoam P50 | lb/hr | 1.06 | 1.06 | 0 |
| | (%) | 2.03% | 2.30% | 0.00% |
| Cycltopentane | lb/hr | 2.4 | 3.0 | 2.0 |
| | (%) | 4.59% | 6.51% | 3.71% |
| iso-Butane | lb/hr | 1.6 | 2.00 | 2.00 |
| | (%) | 3.06% | 4.34% | 3.71% |
| Carbon Dioxide | lb/hr | 1.2 | 0.0 | 0.8 |
| | (%) | 2.30% | 0.00% | 1.48% |
| Total Feed Rate | lb/hr | 52.3 | 46.1 | 53.9 |
| Test Data | | | | |
| Cell Size | mm | .15 | 0.2 | 0.17 |
| Density | pcf | 2.16 | 2.40 | 3.11 |
| R-Factor (5 yr. calc.) | /in | 4.46 | 4.67 | 4.27 |
| R-Factor (measured) | /in | | | 4.7 |

EXAMPLE 1

Was produced using a blend of cyclopentane, butane, and carbon dioxide and using Safoam P-50 as the nucleator. This sample demonstrates the ability of this gas system to attain typical foam insulation densities.

EXAMPLE 2

Was produced using a blend of cyclopentane and butane and using Safoam P-50 as the nucleator. This example demonstrates the ability to produce acceptable foam using a high level of cyclopentane. This example also demonstrates the viability of producing insulation without carbon dioxide in the blowing agent mixture.

EXAMPLE 3

Was produced using a blend of cyclopentane, butane, and carbon dioxide and using Talc concentrate as the nucleators. This example demonstrates that various nucleation products may be successfully used with this gas blend system.

What is claimed is:

1. A process for the production of alkenyl aromatic foams, said process comprising:
   (a) heating alkenyl aromatic resin to a temperature above its melting point to form a melted alkenyl aromatic resin;
   (b) adding to the melted alkenyl aromatic resin a masterbatch mix comprised of:
      (i) styrene resin;
      (ii) rubbery block copolymer; and
      (iii) solid blowing agent, to form an alkenyl aromatic/masterbatch mix blend;
   (c) heating, if necessary, the alkenyl aromatic/masterbatch mix blend to a temperature sufficient to form a melted blend;
   (d) adding to the alkenyl aromatic/masterbatch mix blend or melted blend a non-solid blowing agent comprised of cycloaliphatic gas, wherein said cycloaliphatic gas is present in an amount equal to or greater than the amount of atmospheric gas to form an added melted blend;
   (e) mixing the added melted blend to form a mixed added melted blend; and
   (f) extruding and cooling the mixed added melted blend.

2. An alkenyl aromatic foam made by the process of claim 1, comprised of:
   (a) alkenyl aromatic polymer;
   (b) styrene resin;
   (c) rubbery block copolymer; and
   (d) the decomposition products of solid blowing agent, wherein the foam is comprised of closed cells containing cycloaliphatic gas wherein said cycloaliphatic gas is present in an amount equal to or greater than the amount of atmospheric gas.

3. A process for the production of alkenyl aromatic foams, said process comprising:
   (a) heating alkenyl aromatic resin to a temperature above its melting point to form a melted alkenyl aromatic resin;
   (b) adding to the melted alkenyl aromatic resin
      (1) a masterbatch mix comprised of:
         (i) styrene resin;
         (ii) rubbery block copolymer; and
         (iii) solid blowing agent; and
      (2) talc, to form an alkenyl aromatic/masterbatch mix/talc blend;
   (c) heating, if necessary, the alkenyl aromatic/masterbatch mix/talc blend to a temperature sufficient to form a melted blend;
   (d) adding to the alkenyl aromatic/masterbatch mix/talc blend or melted blend a non-solid blowing agent comprised of cycloaliphatic gas to form an added melted blend, wherein said cycloaliphatic gas is present in an amount equal to or greater than the amount of atmospheric gas,
   (e) mixing the added melted blend to form a mixed added melted blend; and
   (f) extruding and cooling the mixed added melted blend.

4. An alkenyl aromatic foam made by the process of claim 3, comprised of:
   (a) alkenyl aromatic polymer;
   (b) styrene resin;
   (c) rubbery block copolymer;
   (d) the decomposition products of solid blowing agent; and
   (e) talc, wherein the foam is comprised of closed cells containing cycloaliphatic gas, wherein said cycloaliphatic gas is present in an amount equal to or greater than the amount of atmospheric gas.

5. A process for the production of alkenyl aromatic foams, said process comprising:
   (a) heating alkenyl aromatic resin to a temperature above its melting point to form a melted alkenyl aromatic resin;
   (b) adding to the melted alkenyl aromatic resin a masterbatch mix comprised of:
      (i) styrene resin;
      (ii) rubbery block copolymer; and
      (iii) solid blowing agent, to form an alkenyl aromatic/masterbatch mix blend;
   (c) heating, if necessary, the alkenyl aromatic/masterbatch mix blend to a temperature sufficient to form a melted blend;
   (d) adding to the alkenyl aromatic/masterbatch mix blend or melted blend a non-solid blowing agent consisting essentially of cycloaliphatic gas to form an added melted blend;
   (e) mixing the added melted blend to form a mixed added melted blend;
   (f) extruding and cooling the mixed added melted blend.

6. An alkenyl aromatic foam made by the process of claim 5, comprised of:
   (a) alkenyl aromatic polymer;
   (b) styrene resin;
   (c) rubbery block copolymer; and
   (d) the decomposition products of solid blowing agent, wherein the foam is comprised of closed cells containing gas consisting essentially of cycloaliphatic gas.

7. A process for the production of alkenyl aromatic foams, said process comprising:
   (a) heating alkenyl aromatic resin to a temperature above its melting point to form a melted alkenyl aromatic resin;
   (b) adding to the melted alkenyl aromatic resin
      (1) a masterbatch mix comprised of:
         (i) styrene resin;
         (ii) rubbery block copolymer; and
         (iii) solid blowing agent; and
      (2) talc, to form an alkenyl aromatic/masterbatch mix/talc blend;
   (c) heating, if necessary, the alkenyl aromatic/masterbatch mix/talc blend to a temperature sufficient to form a melted blend;

(d) adding to the alkenyl aromatic/masterbatch mix/talc blend or melted blend a non-solid blowing agent consisting essentially of cycloaliphatic gas to form an added melted blend;

(e) mixing the added blend to form a mixed added melted blend; and (f) extruding and cooling the mixed added melted blend.

8. An alkenyl aromatic foam made by the process of claim 7, comprised of:

(a) alkenyl aromatic polymer;

(b) styrene resin;

(c) rubbery block copolymer;

(d) the decomposition products of solid blowing agent; and (e) talc, wherein the foam is comprised of closed cells containing gas consisting essentially of cycloaliphatic gas.

9. A process according to claim 1, 3, 5 or 7, wherein in step (a) the alkenyl aromatic resin is comprised of styrene.

10. A process according to claim 1, 3, 5 or 7, wherein in step (a) the alkenyl aromatic resin is comprised of a copolymer or interpolymer of styrene containing greater than 75 weight percent styrene.

11. A process according to claim 1, 3, 5 or 7, wherein in step (a) the alkenyl aromatic resin is comprised of a blend of styrene and a rubbery polymer.

12. A process according to claim 1, 3, 5 or 7, wherein step (b)(i) the styrene resin has a Vicat softening temperature of between 45 and 82 at 50° C/hr. rise.

13. A process according to claim 1, 3, 5 or 7, wherein in step (b)(i) the styrene resin is comprised of alpha-methylstyrene.

14. A process according to claim 1, 3, 5 or 7, wherein in step (b)(ii) the rubbery block copolymer is selected from the group consisting of A-B, A-B-A, A-B-A-B, graft and radial block copolymers.

15. A process according to claim 1, 3, 5 or 7, wherein in step (b)(iii) the solid blowing agent comprises a mixture of (1) one or more solid organic acids and (2) an alkaline metal carbonate or alkaline metal bicarbonate.

16. A process according to claim 15, wherein the one or more solid organic acids is selected from the group consisting of oxalic acid, succinic acid, adipic acid, phthalic acid and citric acid.

17. A process according to claim 15, wherein the alkaline metal carbonate or alkaline metal bicarbonate is selected from the group consisting of sodium carbonate, potassium carbonate and sodium bicarbonate.

18. A process according to claim 15, wherein the alkali-cacid equivalent ratios are from about 1:3 to about 3:1

19. A process according to claim 18, wherein the alkali-cacid equivalent ratio is from about 0.7:1 to 1.3:1.

20. A process according to claim 1, 3, 5 or 7, wherein the solid blowing agent is comprised of a combination of monosodium citrate and sodium bicarbonate.

21. A process according to claim 20, wherein the combination of monosodium citrate and sodium bicarbonate are encapsulated in vegetable oil and the alkalicacid equivalent ratio is from about 0.9:1 to about 1.1:1.

22. A process according to claim 1, 3, 5 or 7, wherein in step (b) the masterbatch mix is comprised of:

(i) from about 1 to about 55 weight percent of stoichiometric amounts of monosodium citrate and sodium bicarbonate encapsulated in vegetable oil;

(ii) about 3 to 50 weight percent of styrene-ethylene/butylene-styrene block copolymer; and (iii) about 20 to 80 percent of alpha-methylstyrene.

23. A process according to claim 1, 3, 5 or 7, wherein in step (b) the masterbatch mix is comprised of;

(i) about 19.8% to about 54.8% of an equimolar combination of monosodium citrate and sodium bicarbonate encapsulated in vegetable oil;

(ii) about 10% to about 14.4% of styrene-ethylene/butylene-styrene block copolymer, alone , or in combination with styrene-ethylene/propylene block copolymer; and (iii) from about 30.5% to about 67.5% of alpha-methylstyrene.

24. A process according to claim 1, 3, 5 or 7, wherein the masterbatch mix is present in an amount of about 0.01 to about 2% by weight of the alkenyl aromatic resin.

25. A process according to claim 1, 3, 5 or 7, wherein the masterbatch mix is present in an amount of about 0.1 to about 1.5 percent, based upon the weight of the alkenyl aromatic resin.

26. A process according to claim 1, 3, 5 or 7, wherein in step (d) the amount of non-solid blowing agent added is from about 2 to about 20% by weight, based upon the weight of the alkenyl aromatic resin.

27. A process according to claim 1, 3, 5 or 7, wherein the amount of non-solid blowing agent added is from about 3 to about 10% by weight, based upon the weight of the alkenyl aromatic resin.

28. A process according to claim 1, 3, 5 or 7, wherein in step (d) the non-solid blowing agent is comprised of cycloaliphatic gas and atmospheric gas selected from carbon dioxide, nitrogen and mixtures thereof.

29. A process according to claim 1, 3, 5 or 7, further comprising a permeable organic gas.

30. A process according to claim 1, 3, 5 or 7, wherein the cyclopalipaphtic gas is selected from the group consisting of cyclobutane, cyclopentane, and cycloheptane.

31. A process according to claim 1, 3, 5 or 7, wherein the cycloaliphatic gas is comprised of substituted aliphatic gas.

* * * * *